United States Patent
Jørgensen

(10) Patent No.: US 7,967,023 B2
(45) Date of Patent: Jun. 28, 2011

(54) CONTROL VALVE

(75) Inventor: Ole Jørgensen, Slagelse (DK)

(73) Assignee: Frese A/S, Slagelse (DK)

( * ) Notice: Subject to any disclaimer, the term of this patent is extended or adjusted under 35 U.S.C. 154(b) by 482 days.

(21) Appl. No.: 11/916,034

(22) PCT Filed: Jun. 14, 2006

(86) PCT No.: PCT/DK2006/000338
§ 371 (c)(1),
(2), (4) Date: Feb. 5, 2008

(87) PCT Pub. No.: WO2006/136158
PCT Pub. Date: Dec. 28, 2006

(65) Prior Publication Data
US 2008/0245428 A1  Oct. 9, 2008

(30) Foreign Application Priority Data
Jun. 23, 2005  (DK) .................. 2005 00920

(51) Int. Cl.
F24D 19/08  (2006.01)
(52) U.S. Cl. ..................... 137/201; 251/310
(58) Field of Classification Search ............ 137/501; 251/310
See application file for complete search history.

(56) References Cited

U.S. PATENT DOCUMENTS

| | | | | |
|---|---|---|---|---|
| 2,343,375 A | * | 3/1944 | Herman | 137/505.12 |
| 2,936,152 A | * | 5/1960 | Renick | 251/205 |
| 2,943,792 A | | 7/1960 | Moen | |
| 2,951,501 A | * | 9/1960 | Thylefors | 137/501 |
| 3,100,620 A | * | 8/1963 | Kates | 251/208 |
| 3,538,952 A | | 11/1970 | Bayer | |

(Continued)

FOREIGN PATENT DOCUMENTS

AT  319677 A  1/1975

(Continued)

OTHER PUBLICATIONS

International Search Report.

(Continued)

Primary Examiner — John K Fristoe, Jr.
(74) Attorney, Agent, or Firm — William J. Sapone; Coleman Sudol Sapone P.C.

(57) ABSTRACT

A control valve for use in a liquid-carrying system, such as a heating or cooling system, containing a differential pressure governor which keeps the differential pressure between the inlet and the outlet constant. The control valve also includes an arrangement for setting and adjusting the maximum flow of liquid through the valve. This arrangement comprises a flow valve having two cooperating valve members (4 and 6), which are arranged in the flow path and are constructed as two concentric rings, each of which has a recess extending about 180 degrees in the circumferential direction. The outer ring (4) is stationary relative to the valve housing, while the inner ring (6) may be displaced in the circumferential direction by means of a rotatable handle, whereby a greater or smaller overlap between the recesses may be provided. The maximum flow amount may hereby be set manually. The inner ring (6) may also be displaced in the axial direction, whereby a greater or smaller overlap between the recesses in the axial direction may be provided. The flow amount may hereby be adjusted within the limits of the presetting e.g. by means of an actuator. The flow may be blocked completely in an outer position.

5 Claims, 2 Drawing Sheets

U.S. PATENT DOCUMENTS

Figure 1:
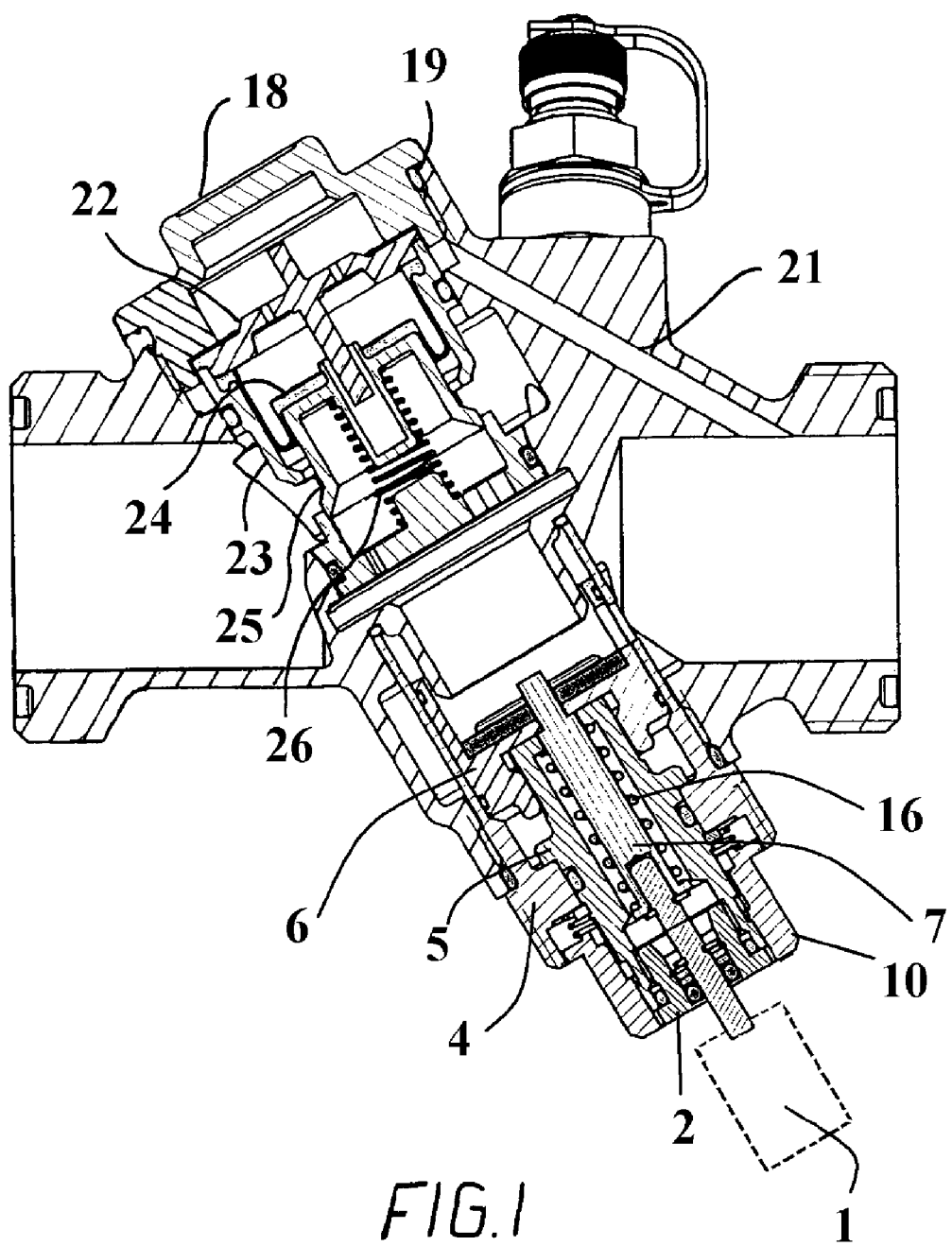

| | | | |
|---|---|---|---|
| 4,702,279 A | 10/1987 | Giese et al. | |
| 5,860,591 A | 1/1999 | Gylov et al. | |

FOREIGN PATENT DOCUMENTS

| | | |
|---|---|---|
| BE | 370472 A | 5/1930 |
| DE | 3615432 A1 | 11/1987 |
| DE | 10256035 B3 | 9/2004 |
| EP | 1067321 A | 1/2001 |
| GB | 168220 A | 9/1921 |
| GB | 587165 A | 6/1945 |
| GB | 948738 A | 2/1964 |
| WO | WO90/01657 A | 2/1990 |
| WO | WO95/17622 A | 6/1995 |
| WO | WO96/09484 A | 3/1996 |
| WO | WO96/09485 A | 3/1996 |
| WO | WO2005/038316 A | 4/2005 |
| WO | WO2008/052553 A | 5/2008 |

OTHER PUBLICATIONS

Notice of Opposition to corresponding European Patent Application No. 1 896 755, dated Nov. 22, 2010.

Decision in Opposition to corresponding Danish Patent, patent upheld, dated Nov. 18, 2008.

Grounds for Opposition to the Danish Corresponding Patent, dated May 29, 2008.

Statement by Troels Pedersen, denoted as P5 in the Danish Opposition, submitted by opposer, dated Mar. 28, 2008, with English Translation.

* cited by examiner

CONTROL VALVE

THE PRIOR ART

The invention relates to a control valve for use in liquid-carrying systems of the type which is adapted to serve as a differential pressure governor, as it maintains a constant differential pressure over an inlet side and an outlet side irrespective of the amount flowing therethrough.

Valves of this type are used particularly in connection with systems for heating or cooling, e.g. in district or local heating systems, but in general everywhere where there is a need for the above-mentioned functions in liquid-carrying systems.

Differential pressure governors are known for maintaining a constant differential pressure over an inlet side and an outlet side irrespective of the amount of liquid flowing therethrough, where a throttle member sets itself in a balance under the influence of the inlet pressure on the one side and the outlet pressure and a spring pressure on the other side, so that the pressure difference will always be the same, irrespective of the other circumstances, such as the flow amount through the governor.

THE OBJECT OF THE INVENTION

The valve according to the invention is of this type. The object of the invention is to be able to preset the flow through the valve, and this is achieved according to the invention when, additionally, the valve is provided with an arrangement for setting and adjusting the amount of liquid flowing therethrough.

Thus, this arrangement comprises an adjustable flow valve having two valve members consisting of two concentric rings with annular recesses which extend over approximately 180 degrees. The external one of these two rings is stationary, while the internal one is rotatably connected with a handle, so that the overlap of the recesses may be adjusted manually. It is thus possible to preset the maximum flow through the control valve.

However, the internal ring, and optionally also the carrier, is displaceable in the axial direction, whereby the axial overlap between the recesses may be changed. This makes it possible to adjust the flow through the valve by means of an actuator (1, shown in phantom) within the limits of the preset value, and, if so desired, to block the flow completely in the one outer position of the displacement.

In every position of this flow control, a constant pressure difference is maintained over the inlet side and the outlet side by virtue of the differential pressure governor mentioned initially.

The arrangement according to the invention provides a control valve where the maximum flow may be adjusted by simple rotation of a handle, and which may be adjusted to any value between zero and this maximum value by an axial displacement, optionally by an actuator.

The device according to the invention ensures that the inner ring may be made displaceable in the circumferential direction as well as in the axial direction in a simple manner by means of the carrier for the handle, which allows axial displacement, as its carrier faces are axial.

When the device is constructed according to the invention, a particularly simple structure is achieved, as the carrier may be used as a connection between the actuator and the internal ring.

THE DRAWING

Figure 2:
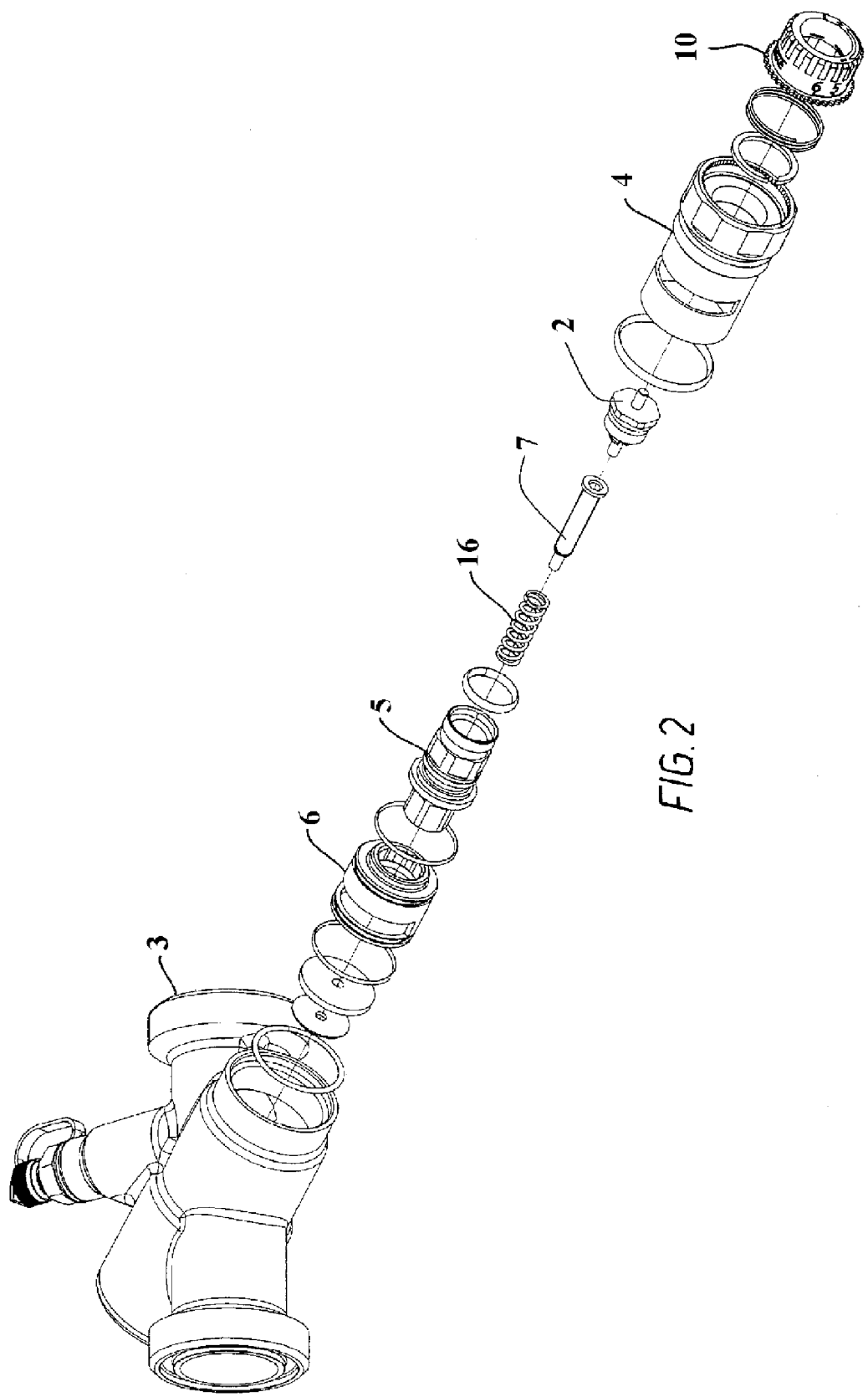

An embodiment of the invention will be explained more fully with reference to the drawing, in which FIG. 1 shows a sectional view through the control valve which illustrates the differential pressure governor in particular, and FIG. 2 shows the arrangement for setting the maximum flow and for adjusting the flow, in disassembled form.

DESCRIPTION OF THE EXEMPLARY EMBODIMENT

FIG. 1 shows a control valve having an inlet and an outlet. The control mechanism consists of a housing 23, a rolling diaphragm 24, a piston 25, which also supports the rolling diaphragm 24. A cover 22 with a guide for the piston 25 is secured to the housing 23. The housing 23 has a plurality of openings or slots in the periphery which are closed more or less by the piston 25 according to the axial position of the piston. The pressure at the inlet is transferred to the outer side of the rolling diaphragm through a bore or a capillary pipe 21. A spring 26 urges the piston to its top position, while the piston, at its inner side, is affected by the pressure before the adjusting slots.

In use, a balance is provided between the inlet pressure and the outlet pressure plus the spring force, so that the differential pressure corresponds to the spring force. This differential pressure will therefore be constant with a given spring force.

FIG. 2 shows the arrangement in the housing 3 of the control valve for adjusting and optionally blocking the flow amount. A manually operated rotary button 10 is connected with a carrier 5, so that the rotary button can bring along the carrier in the direction of rotation, while the carrier 5 is axially displaceable relative to the rotary button 10.

Stationary relative to the housing is an outer cylindrical valve member 4 which is provided with an annular slot extending over approximately 180 degrees. Within this and concentrically with it is an inner valve member 6 which has a corresponding annular slot. These two slots are present in the normal position opposite each other. The last-mentioned inner valve member is connected with the carrier 5, so that its angular position relative to the outer valve member may be adjusted by means of the rotary button 10. Thereby, the overlap in the circumferential position between the two slots and thus the maximum flow amount through the governor may be adjusted manually.

The inner valve member 6 is axially displaceable relative to the housing and the rotary button 10 against the effect of a pressure spring 16. which resides within the carrier 5, disposed over a support 7 which has one end engaged with the inner ring 6 and another end connected through an element 2 to an actuator 1, for axially displacing the support 7 and the engaged inner ring 6 against the bias of the pressure spring 16. By such an axial displacement, the axial overlap between the slots in the outer valve member and the inner valve member may be changed, whereby the flow amount through the governor may be set or adjusted within the limits of the preset maximum value. Blocking of the flow may be established in an outer position in that the two slots are brought entirely out of mutual connection.

Thus, a control valve is provided which is relative simple in its mechanical structure and nevertheless offers many setting and adjustment options.

The invention claimed is:

1. A control valve for use in liquid-carrying systems, comprising:
    a valve housing (3) with an inlet side and an outlet side, and
        including an arrangement for maintaining a constant
        differential pressure between the inlet side and the outlet
        side independently of the liquid amount flowing therethrough, wherein a throttle element sets itself in a balance under the influence of the inlet pressure on the one side and the outlet pressure and a spring pressure on the other side, and further comprising:

an arrangement for adjusting an amount of liquid flowing therethrough, the arrangement including two cooperating valve members (4, 6) arranged in the flow path, said valve members being constructed as two concentric rings which each have a recess extending in the circumferential direction, an outer concentric ring (4) being fixed relative to the valve housing (3), an inner concentric ring (6) being displaceable in a circumferential direction under the influence of a rotatable handle (10), such that a greater or smaller overlap of the outer stationary recess and the inner displaceable recess may be established manually in the circumferential direction, the inner ring with the displaceable inner recess being displaceable also in the axial direction, so that a greater or smaller overlap of the outer stationary recess and the inner displaceable recess may be provided in the axial direction, the inner ring being connectable to an actuator for adjusting the axial overlap.

2. A control valve according to claim 1, wherein the rotatable handle (10) is firmly connected with the inner ring (6), by a carrier having axially extending engagement faces.

3. A control valve according to claim 2 wherein the carrier (5) is firmly connected with the inner ring (6) and further comprising a pressure spring (16) located within the carrier, the inner ring being displaceable in the axial direction against the action of the pressure spring (16).

4. A control valve according to claim 1 wherein at least one of said recesses extends approximately 180 degrees in the circumferential direction.

5. A control valve for use in liquid-carrying systems, comprising:

a valve housing (3) with an inlet side and an outlet side, and including an arrangement for maintaining a constant differential pressure between the inlet side and the outlet side independently of the liquid amount flowing therethrough, wherein a throttle element sets itself in a balance under the influence of the inlet pressure on the one side and the outlet pressure and a spring pressure on the other side, and further comprising:

an arrangement for adjusting an amount of liquid flowing therethrough, the arrangement including two cooperating valve members (4, 6) arranged in the flow path, said valve members being constructed as two concentric rings which each have a recess extending approximately 180 degrees in the circumferential direction, an outer concentric ring (4) being fixed relative to the valve housing (3), an inner concentric ring (6) being displaceable in a circumferential direction under the influence of a rotatable handle (10), such that a greater or smaller overlap of the outer stationary recess and the inner displaceable recess may be established manually in the circumferential direction, the inner ring with the displaceable inner recess being displaceable also in the axial direction, so that a greater or smaller overlap of the outer stationary recess and the inner displaceable recess may be provided in the axial direction, the inner ring being connectable to an actuator for adjusting the axial overlap.

\* \* \* \* \*